(12) United States Patent  
Calissendorff et al.

(10) Patent No.: US 9,471,208 B2  
(45) Date of Patent: Oct. 18, 2016

(54) METHOD FOR POSITIONING OF CONTROL ELEMENTS WITHIN GUI

(71) Applicant: Plejd AB, Göteborg (SE)

(72) Inventors: Erik Calissendorff, Göteborg (SE); Martin Andersson, Göteborg (SE)

(73) Assignee: PLEJD AB, Gothenburg (SE)

( * ) Notice: Subject to any disclaimer, the term of this patent is extended or adjusted under 35 U.S.C. 154(b) by 40 days.

(21) Appl. No.: 14/346,399

(22) PCT Filed: Sep. 26, 2012

(86) PCT No.: PCT/SE2012/051020  
§ 371 (c)(1),  
(2) Date: Mar. 21, 2014

(87) PCT Pub. No.: WO2013/048317  
PCT Pub. Date: Apr. 4, 2013

(65) Prior Publication Data  
US 2014/0258896 A1      Sep. 11, 2014

(30) Foreign Application Priority Data

Sep. 26, 2011   (EP) .................................... 11182776

(51) Int. Cl.  
*G06F 3/00* (2006.01)  
*G06F 3/0484* (2013.01)  
*G06F 3/0482* (2013.01)

(52) U.S. Cl.  
CPC ......... *G06F 3/04842* (2013.01); *G06F 3/0482* (2013.01)

(58) Field of Classification Search  
CPC .................................................... G06F 3/0482  
See application file for complete search history.

(56) References Cited

U.S. PATENT DOCUMENTS 5,767,852 A    6/1998  Keller et al.  
7,257,777 B1   8/2007  Kanevsky et al.  
(Continued)

OTHER PUBLICATIONS

Laehyun Kim, An Universal Remote Controller with Haptic Interface for Home Devices, International Conference on Consumer Electronics (ICCE), 2010 Digest of Technical Papers Interaction Conference on Jan. 9, 2010, Nha Trang, Vietnam.

(Continued)

*Primary Examiner* — Omar Abdul-Ali  
(74) *Attorney, Agent, or Firm* — Babcock IP, PLLC

(57) ABSTRACT

The present invention relates to a method for positioning of control elements within a graphical user interface (GUI) of a control unit, the method comprising the steps of determining a plurality of functions, represented by a corresponding plurality of control elements, of a first electronic device to be controlled, positioning the plurality of control elements for the first electronic device at predefined positions within the GUI by rating the related functionality of each of the plurality of functions by comparing the rating with a predetermined priority definition of different positions within the GUI, and displaying the GUI Advantages with the invention comprises the possibility to dynamically and on-the-fly position control elements, e.g. buttons presented in GUI, based on a matching between rating of the functionality corresponding to the control elements and a rating of different positions within the GUI.

6 Claims, 2 Drawing Sheets

(56) References Cited

U.S. PATENT DOCUMENTS

| | | | |
|---|---|---|---|
| 2006/0041904 A1* | 2/2006 | Lee | H04H 60/65 |
| | | | 725/28 |
| 2007/0082707 A1 | 4/2007 | Flynt et al. | |
| 2011/0131533 A1* | 6/2011 | Ku | G06F 3/0482 |
| | | | 715/836 |
| 2012/0056875 A1* | 3/2012 | Lee | G06F 3/012 |
| | | | 345/419 |
| 2012/0179998 A1* | 7/2012 | Nesladek | G06F 3/0488 |
| | | | 715/835 |

OTHER PUBLICATIONS

Heidi Wiik Edlund, International Search Report for PCT Application PCT/SE2012/051020, Feb. 13, 2013, Stockholm, Sweden.

* cited by examiner

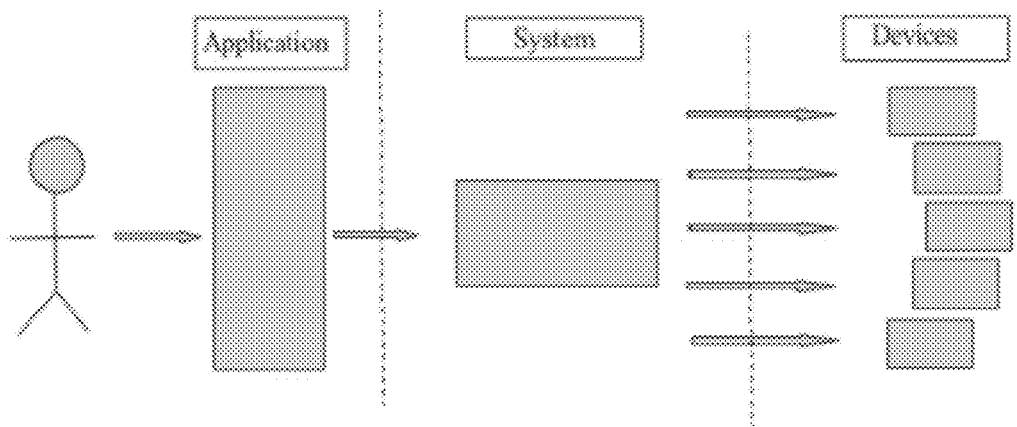
Fig. 1
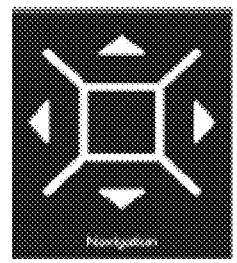
Fig. 2a
Fig. 2b
Fig. 3
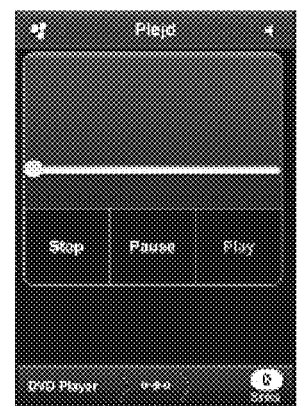
Fig. 4

METHOD FOR POSITIONING OF CONTROL ELEMENTS WITHIN GUI

TECHNICAL FIELD

The present invention relates to a method for positioning of control elements within a graphical user interface (GUI) of a control unit. The invention also relates to a corresponding control unit configured for performing such a method as well as a corresponding computer program product.

BACKGROUND OF THE INVENTION

Home automation is a fast developing area which regroups all the technologies to control a home electronic environment, typically including a lot of different electronic devices such as for example a television set, a DVD player, a radio, a lighting unit, an HVAC, etc. For controlling a complex home electronic environment comprising such electronic devices, there is typically a need for facilitating a combined control interface allowing the user to have total control of the home electronic environment in an easy way.

Even though some advances have been made in providing such a combined control interface, there is still a desire to introduce further improvements, specifically in relation to the intuitivity of the combined control interface.

SUMMARY OF THE INVENTION

According to an aspect of the invention, the above is at least partly met by a method for positioning of control elements within a graphical user interface (GUI) of a control unit, the method comprising the steps of determining a plurality of functions, represented by a corresponding plurality of control elements, of a first electronic device to be controlled, positioning the plurality of control elements for the first electronic device at predefined positions within the GUI by rating the related functionality of each of the plurality of functions by comparing the rating with a predetermined priority definition of different positions within the GUI, and displaying the GUI Advantages with the invention comprises the possibility to dynamically and on-the-fly position control elements, e.g. buttons presented in GUI, based on a matching between rating of the functionality corresponding to the control elements and a rating of different positions within the GUI. Accordingly, by predefining e.g. a "priority map" for a specific type of electronic device, or a specific GUI of the electronic device, a developer can put less focus on where to place the control elements, still generating a control interface where the control elements are positioned in an intuitive manner resulting in an appealing and easily controllable GUI. Thus, more focus may be put in providing interesting functionality than in determining/deciding where to place control elements (within the GUI) for achieving an appealing GUI being shown on the electronic device.

In an embodiment, the method further comprises the steps of identifying groups of related functionality of the first electronic device provided by the plurality of control elements, creating at least one control element group based on the identification of groups of related functionality of the first electronic device, and positioning the at least one control element group at a predefined position within the GUI (i.e. in relation to the above discussion of the "priority map").

For example, a "play sound button" and a "mute sound button" defining functionality for controlling the first electronic device may, on a "GUI level", be combined to a logical control block due to the identification of the related functionality, e.g. as both relates to controlling the provision of an audio experience. Accordingly, the same type of functionality may automatically be positioned at one place within the GUI without any decision having to be made by the developer of the GUI, rather, the developer simply provides the control elements and the functionality behind the control elements and the method according to the invention handles the presentation within the GUI. Put differently, "logical control blocks" may be defined based on the analysis and identification of common functionality provided in relation to the control elements.

In relation to the above discussion, the predefinition of where the at least one control element group is positioned may be determined by rating the similar functionality of the control element group, and comparing the rating with the predetermined priority definition (on a "group level") of different positions within the GUI. Accordingly, it is possible to prioritize where within the GUI the group of control elements is positioned.

Additionally, if further electronic devices are to be controlled using the same control unit, the method may preferably be configured to further provide the steps of determining a plurality of functions, represented by corresponding control elements, of a second electronic device to be controlled, and positioning the plurality of control elements for the first and the second electronic device at predefined positions within the GUI by rating the related functionality of each of the plurality of functions by comparing the rating with a predetermined priority definition of different positions within the GUI. Similar advantages as discussed above may accordingly be provided also when introducing further functionality (and related control elements) of the second electronic device.

Advantageously, the method may additionally comprise the steps of identifying groups of related functionality of the second electronic device provided by the plurality of control elements, and creating at least one control element group based on the identification of groups of related functionality of the first and the second electronic device. It should be understood that corresponding functionality provided by both the first and the second electronic device may be combined within the same group.

By means of such a possibility the GUI may be able to be adapted to, in a grouped manner, handle all related functionality of a plurality of different, e.g. comprising the first and the second, electronic devices of e.g. a home electronic environment.

It should be understood that the inventive concept is applicable to any number of electronic devices, e.g. one, two, ten, 100, etc.

According to another aspect of the invention there is provided a control unit for controlling at least a first electronic device, the control unit comprising a display for displaying a graphical user interface (GUI), wherein the control unit is configured to determine a plurality of functions, represented by a corresponding plurality of control elements, of a first electronic device to be controlled, and position the plurality of control elements for the first electronic device at predefined positions within the GUI by rating the related functionality of each of the plurality of functions by comparing the rating with a predetermined priority definition of different positions within the GUI, and display the GUI. This aspect of the invention provides similar advantages as discussed above in relation to the previous aspect of the invention.

In a preferred embodiment, the control unit may at least be one of a remote control, a mobile phone, a tablet computer, a laptop, or a stationary computer. Similarly, the e.g. first and/or second electronic device may at least be one of a home entertainment device, a lighting unit, a HVAC unit or an appliance. Other electronic devices or control units, present and future, for implementing the inventive concept may of course be considered and are within the scope of the invention. It should be noted that the control unit may be comprised in a home automation system, further comprising e.g. the first and the second electronic devices.

According to a further aspect of the present invention, there is provided a computer program product comprising a computer readable medium having stored thereon computer program means for a control unit adapted for controlling at least a first electronic device, the control unit comprising a display for displaying a graphical user interface (GUI), wherein the computer program product comprises code for determining a plurality of functions, represented by a corresponding plurality of control elements, of a first electronic device to be controlled, code for positioning the plurality of control elements for the first electronic device at predefined positions within the GUI by rating the related functionality of each of the plurality of functions by comparing the rating with a predetermined priority definition of different positions within the GUI, and code for displaying the GUI. Also this aspect of the invention provides similar advantages as discussed above in relation to the previous aspects of the invention.

The control unit preferably comprises a a micro processor or any other type of computing device. Similarly, the computer readable medium may be any type of memory device, including one of a removable nonvolatile random access memory, a hard disk drive, a floppy disk, a CD-ROM, a DVD-ROM, a USB memory, an SD memory card, or a similar computer readable medium known in the art.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which:

FIG. 1 conceptually illustrates a method for controlling a home automation system using a control unit according to a currently preferred embodiment;

FIGS. 2a and 2b shows examples of control element groups;

FIG. 3 illustrates a priority grid for a control unit according to the invention;

FIG. 4 provides a conceptual interface of a control unit according to the invention.

DETAILED DESCRIPTION

Figure 5:
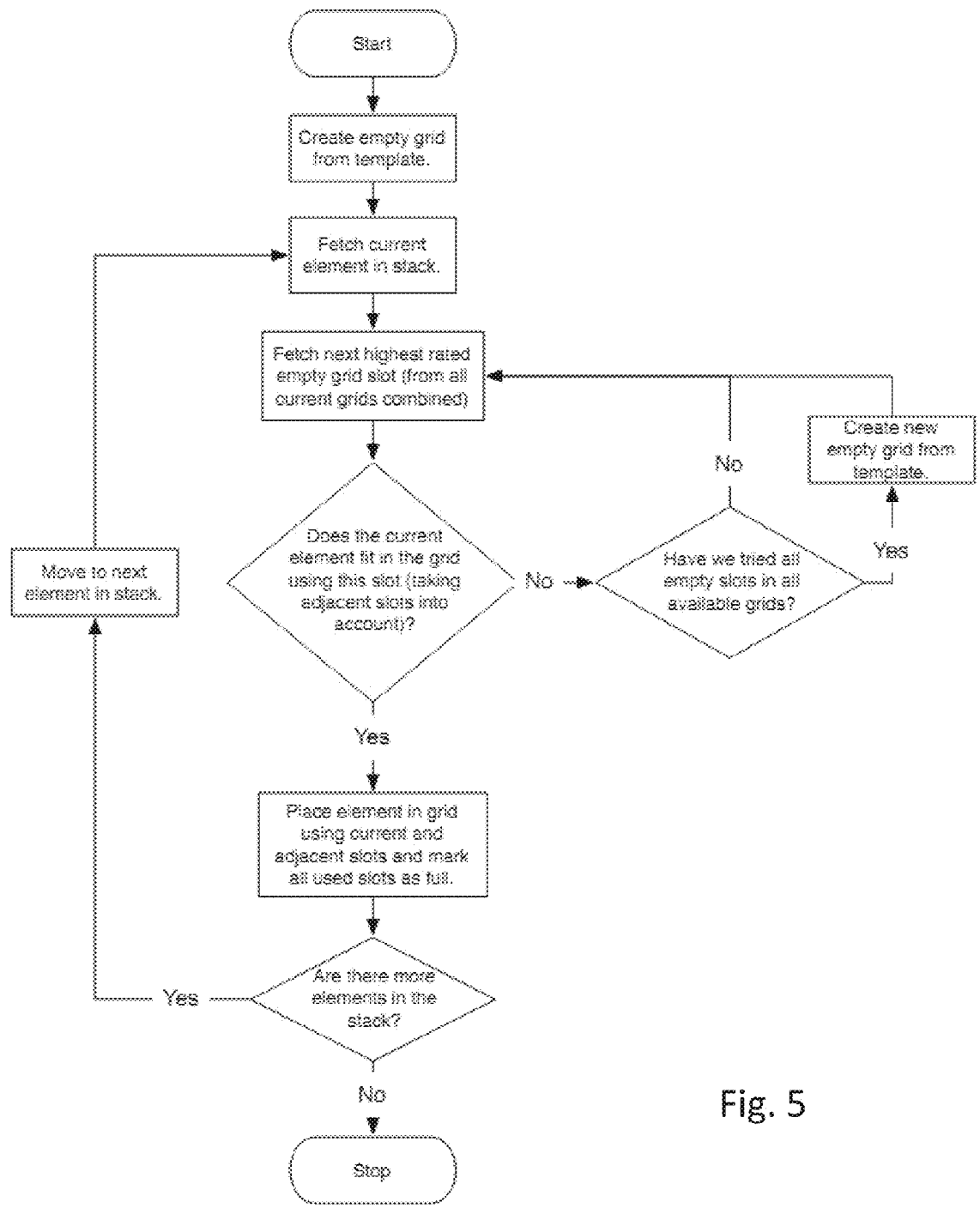
FIG. 5 illustrates a flow chart relating to an embodiment of the inventive method for placement of control elements.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Referring now to the drawings and to FIG. 1 in particular, there is depicted, conceptually, an example of how a home automation system may be controlled. In the illustrated embodiment, the home automation system comprises a control unit (Application), possibly implementing a method according to the invention, a control hub (System) (e.g. being "centrally arranged" or provided in a distributed manner), and a plurality of controllable electronic devices (Devices), including for example a home entertainment device, a lighting system, a HVAC unit or an appliance.

As discussed above and with further reference to FIGS. 2a and 2b, the general concept of the invention may in an embodiment includes creating control element groups, where the individual control elements of one group have related functionality. According to the invention, the separate control elements may however also be arranged separately in line with the inventive concept, i.e. without arranging a plurality of control elements in groups based on related functionality.

In the illustrated embodiment, the functionality provided by the separate control elements of the electronic device(s) may be provided to the control unit as a list of unsorted controls. As an example, the Play control of a DVD player may be represented by a button while the Volume control may be represented by a slide bar. According to the invention, some controls may be grouped together for allowing a visual display within the GUI (e.g. on the same page, the same tab, within a "scroll area", etc.) for example including control functionality defined as Play, Forward, Backward, Stop, Pause.

Thus, groups of control elements may be defined and a graphic element, called skeletons, can be assigned to each of these groups. Accordingly, when the controls' list is fetched, it may be sorted into groups, where each group has a corresponding skeleton (graphic elements). Typically, this skeleton order and place the group controls in an appealing manner, after which the skeleton is placed on a "grid" of the GUI according to its priority. Preferably, the "size" of a control element or a combined group of control elements may be taken into account for optimizing the positioning within the GUI.

As discussed above, the determination of where to place a specific control element or group of control element is determined based matching the priority of the functionality relating to the control element or group of control elements. It may thus be possible to in advance assign a specific "priority level" for each type of functionality, and e.g. in relation to determining the priority level for a group of control elements aggregate the priority level for each of the control elements within the group. Alternatively, a max, min or average value may be determined for the group, e.g. facilitating a simplified priority level comparison between a single control element (i.e. not included in a group) and a combined group of control elements. FIGS. 2a and 2b show two typical examples of controls which should be reunited in the same group.

Turning now to FIGS. 3-5 in conjunction, it is further noted that positioning of a control group such as shown in FIGS. 2a and 2b within a GUI as shown in FIG. 4 preferably depends on a "predefined priority map". The predefined priority map relies preferably on the above mentioned grid corresponding to different positions within the GUI. However, it should be noted that the priority map may be defined in different manner depending on the specific implementation, e.g. the priority map may relate to a single as well as a plurality of grids, where the grid(s) have the same or are of different size. In the illustrated embodiment, each control element or group of control elements is provided with a priority level which will permit positioning/placement in relation to the priority map. Typically, the priority map may be designed (and downloaded to) to match the control unit, e.g. mobile phone or tablet model, on which the application is running. For in relation to an iPhone, the priority map may for example be defined as show in FIG. 3.

In one example, the center of the screen may be defined to have the highest priority (as exemplified in FIG. 3). If there are more controls to place on the grid than available space, for example in relation to e.g. a smartphone implementation and as is illustrated in relation to the flow chart of FIG. 5, a new page/tab/scrollable view/etc. may be generated and the controls which didn't fit will be placed on this new page.

The present disclosure contemplates methods and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

We claim:

1. A method for positioning of control elements of a control interface within a graphical user interface (GUI) of a control unit, the control unit comprising a display for displaying the GUI, the method comprising:
   determining a plurality of functions, represented by a corresponding plurality of control elements, of a first electronic device to be controlled using the control interface, the first electronic device arranged separate from the control unit,
   determining a plurality of functions, represented by corresponding control elements, of a second electronic device to be controlled,
   positioning the plurality of control elements for the first and the second electronic device at predefined positions within the GUI by rating the related functionality of each of the plurality of functions by comparing the rating with a predetermined priority definition of different positions within the GUI, and
   displaying the GUI,
wherein a priority rating of the functionality relating to each of the plurality of control elements is matched with a predetermined priority definition for different positions within the GUI, and
wherein the different positions within the GUI are defined to correspond to a grid, the grid selected to match a size of the display.

2. The method according to claim 1, further comprising the steps of:
   identifying groups of related functionality of the first electronic device provided by the plurality of control elements;
   creating at least one control element group based on the identification of groups of related functionality of the first electronic device; and
   positioning the at least one control element group at a predefined position within the GUI.

3. The method according to claim 1, further comprising the steps of:
   identifying groups of related functionality of the second electronic device provided by the plurality of control elements; and
   creating at least one control element group based on the identification of groups of related functionality of the first and the second electronic device.

4. A control unit for controlling at least a first electronic device, the control unit comprising a display for displaying a graphical user interface (GUI), wherein the control unit is configured to:
   determine a plurality of functions, represented by a corresponding plurality of control elements of a control interface, of the first electronic device to be controlled;
   determine a plurality of functions, represented by corresponding control elements, of a second electronic device to be controlled,
   position the plurality of control elements for the first and the second electronic device at predefined positions within the GUI by rating the related functionality of each of the plurality of functions by comparing the rating with a predetermined priority definition of different positions within the GUI, and display the GUI, wherein a priority rating of the functionality relating to each of the plurality of control elements is matched with a predetermined priority definition for different positions within the GUI, and wherein the different positions within the GUI are defined to correspond to a grid, the grid selected to match a size of the display.

5. The control unit according to claim 4, wherein the control unit is further configured to:

identify groups of related functionality of the first electronic device provided by the plurality of control elements;

create at least one control element group based on the identification of groups of related functionality of the first electronic device; and position the at least one control element group at a predefined position within the GUI.

6. The control unit according to claim 4, wherein the control unit is at least one of a remote control, a mobile phone, a tablet computer, a laptop, or a stationary computer.

\* \* \* \* \*